3,126,374
7β-METHYL PROGESTERONE DERIVATIVES
Howard J. Ringold and John A. Zderic, Mexico City, Mexico, assignors, by mesne assignments, to Syntex Corporation, a corporation of Panama
No Drawing. Filed Oct. 13, 1958, Ser. No. 766,706
Claims priority, application Mexico Oct. 15, 1957
7 Claims. (Cl. 260—239.55)

The present invention relates to novel cyclopentanophenanthrene compounds and to a novel process for the production thereof.

More particularly the present invention relates to the production of 7β-methyl derivatives of progesterone including derivatives having a 17α-acyloxy group derived from a hydrocarbon carboxylic acid of less than 12 carbon atoms. These compounds are all hormones having a marked progestational activity.

In accordance with the present invention it has been discovered that progesterone or 17α-hydroxy progesterone upon treatment with a ketalizing agent gives the corresponding bis-ketals, bromination with an N-bromo amide or N-bromo-imide in the presence of strong light gives the corresponding 7-bromo compounds which are further converted to the corresponding 7-hydroxy compounds and then to the corresponding 7-keto compounds. Reaction of these keto compounds with a methyl magnesium halide produces the corresponding $\Delta^{6}$-7-methyl, 7-hydroxy compounds, hydrolysis and dehydration gives novel 7β-methyl-$\Delta^{4,6}$-compounds which are selectively hydrogenated to the desired 7β-methyl-$\Delta^{4}$-derivatives. Further in the case of the 17α-hydroxy compounds esterification is carried out either of the $\Delta^{4,6}$ intermediates or the 7β-methyl-17-hydroxy progesterone to give the 17α-acyloxy derivatives.

The novel final products and certain of the intermediates of the present invention are therefore indicated by the following formula:

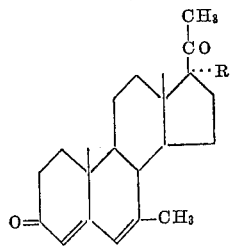

and

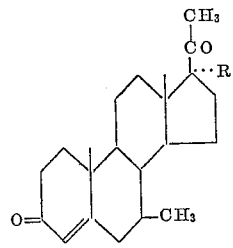

In the above formulas R represents hydrogen, hydroxy or acyloxy wherein the acyl group is derived from a hydrocarbon carboxylic acid of less than 12 carbon atoms. These acyl groups may be, as is known in the art, saturated or unsaturated, straight or branched chain aliphatic, cyclic or mixed cyclic aliphatic. The acyl groups may contain conventional substituents such as halogen or methoxy. Typical are acetate, propionate, butyrate, hemisuccinate, caproate, benzoate, trimethylacetate, cyclopentylpropionate, acetoxypropionate, phenoxypropionate and β-chloropropionate.

A portion of the novel process of the present invention is illustrated by the following equation:

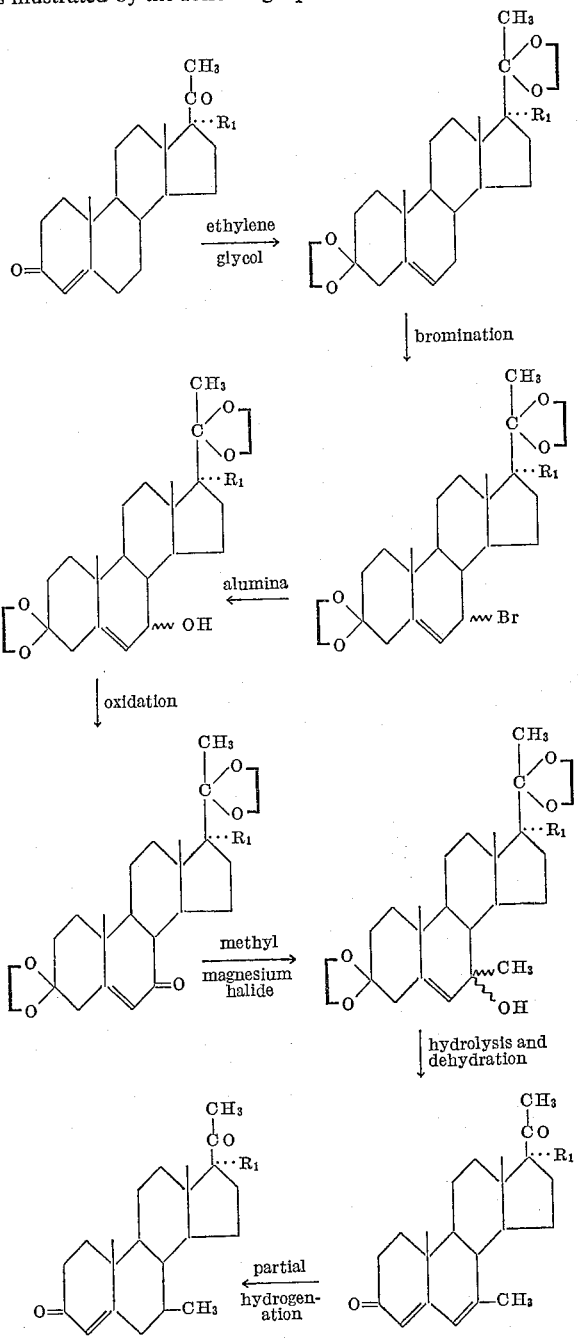

In the above equation $R_1$ represents hydrogen or hydroxy.

In practicing the steps above outlined progesterone or 17α-hydroxy progesterone were treated with ethylene glycol in the presence of a catalytic amount of p-toluenesulfonic acid to form the corresponding 3,20-bis-cycloethyleneketals. These ketals were then treated with an N-bromoamide such as N-bromoacetamide or an N-bromoimide such as N-bromosuccinimide in the presence of strong light to give the corresponding 7-bromo-3,20-bis-ethylenedioxy-$\Delta^{5}$-pregnene or 7-bromo-3,20-bis-ethylenedioxy-$\Delta^{5}$-pregnen-17α-ol. These compounds on treatment with chromatographic type neutral alumina were transformed to the corresponding 7-ol compounds and treatment of the 7-ol compounds with an oxidizing agent such as chromium trioxide in pyridine gave the corresponding 7-one derivatives. Reaction of the 7-one derivatives with a methyl magnesium halide produce the corresponding 7-hydroxy, 7-methyl compounds and acid treatment of these compounds hydrolyzed the ketal groups and dehydrated to give the corresponding 7-methyl-$\Delta^{4,6}$-pregnadien-3,20-dione derivatives.

Partial and selective hydrogenation of these last mentioned compounds by treating with hydrogen at room temperature and atmospheric pressure in the presence of a hydrogenation catalyst until about one mole of hydrogen was absorbed gave the corresponding 7$\beta$-methyl-progesterone and 7$\beta$-methyl-17$\alpha$-hydroxyprogesterone. Preferably the hydrogenation catalyst was a palladium or platinum catalyst and palladium on calcium carbonate was found especially suitable.

To form esters of 7$\beta$-methyl-17$\alpha$-hydroxyprogesterone the free 7$\beta$-methyl-17$\alpha$-hydroxyprogesterone is treated with an excess of an acid anhydride of a hydrocarbon carboxylic acid of less than 12 carbon atoms preferably in the presence of an acid catalyst such as p-toluenesulfonic acid. The reaction may be started by refluxing and the reaction mixture kept for several days for completion. The initial product is the corresponding 3-enol-17-diacylate, which is selectively saponified as with alkali metal hydroxide under mild conditions to give the corresponding 17-acylate. A modified method for preparing these esters involves formation of the 3-enol-17-diacylate of 7-methyl-$\Delta^{4,6}$-pregnadien-17$\alpha$-ol-3,20-dione in the same way as just described followed by selective saponification to form the 17-acylate of 7-methyl-$\Delta^{4,6}$-pregnadien-17$\alpha$-ol-3,20-dione. Selective and partial hydrogenation in the same way as described in connection with the free compound produced the corresponding 17-acylate of 7$\beta$-methyl-17$\alpha$-hydroxyprogesterone.

The following specific examples serve to illustrate but are not intended to limit the present invention.

*Example I*

To a mixture of 500 cc. of benzene, 40 cc. of ethyleneglycol and 1 g. of p-toluenesulfonic acid there was added with vigorous stirring 20 g. of progesterone. In the course of 8 hours the mixture was concentrated to a volume of 150 cc., cooled, treated with aqueous sodium bicarbonate solution and extracted with chloroform; the extract was washed with water to neutral, dried over anhydrous sodium sulfate, filtered, mixed with a few drops of pyridine and evaporated to dryness. Several recrystallizations from acetone-hexane yielded the 3,20-bis-cycloethyleneketal of progesterone.

To a solution of 5 g. of this bis-ketal in 200 cc. of carbon tetrachloride placed in a flask fitted with a reflux condenser there was added 2.7 g. of N-bromosuccinimide and the mixture was refluxed for 10 minutes under illumination with a "G.E. Photoflood" lamp. The mixture was cooled and filtered and the filtrate which contained the 7-bromo-3,20-bis-ethylenedioxy-$\Delta^5$-pregnene was subjected to the following operation without isolation of the bromo compound. The analytical sample of the latter was obtained in another experiment by concentration of the solution of the 7-bromo compound under reduced pressure and recrystallization of the residue from acetone-ether.

To the solution of 7-bromo-3,20-bis-ethylenedioxy-$\Delta^5$-pregnene there was added 50 g. of neutral alumina and the mixture was stirred at room temperature for 3 hours, filtered, washing the filter with acetone, and the combined filtrate and washings was evaporated to dryness under reduced pressure. The residue consisted of 3,20-bis-ethylenedioxy-$\Delta^5$-pregnen-7-ol which was used for the following step without further purification; the analytical sample of this alcohol was obtained in another experiment by recrystallization from acetone-hexane.

The crude 3,20-bis-ethylenedioxy-$\Delta^5$-pregnen-7-ol, obtained as described above, was dissolved in 30 cc. of pyridine, cooled to 0° C. and treated with 4 g. of chromium trioxide which was added in portions and with vigorous stirring. The mixture was stirred overnight at room temperature and then diluted with 100 cc. of ethyl acetate and filtered; the filtrate was passed through a short column of alumina and then evaporated to dryness. Crystallization of the residue from acetone-hexane containing a few drops of pyridine yielded 3,20-bis-ethylenedioxy-$\Delta^5$-pregnen-7-one.

To a solution of 3 g. of the above compound in 100 cc. of tetrahydrofurane there was added 25 cc. of an ether solution of methyl magnesium bromide and the mixture was stirred at room temperature for 5 hours. It was then poured in 500 cc. of ice water containing 25 g. of ammonium chloride and the product was extracted with ethyl acetate. The extract was washed with water to neutral, dried over anhydrous sodium sulfate, filtered, treated with a few drops of pyridine and evaporated to dryness to give the crude 7-methyl-3,20-bis-ethylenedioxy-$\Delta^5$-pregnen-7-ol. The pure compound was obtained through several recrystallizations from acetone-hexane.

2 g. of the crude 7-methyl-3,20-bis-ethylenedioxy-$\Delta^5$-pregnen-7-ol was mixed with 30 cc. of 80% acetic acid and the mixture was heated on the steam bath for 1 hour and poured into ice water; the crystalline precipitate was collected by filtration, washed with water, dried and recrystallized from acetone-hexane, thus giving 7-methyl-$\Delta^{4,6}$-pregnadien-3,20-dione.

To 50 cc. of benzene containing 0.6 g. of pre-reduced 2% palladium on calcium carbonate catalyst there was added 1 g. of 7-methyl-$\Delta^{4,6}$-pregnadien-3,20-dione and the mixture was hydrogenated under stirring at room temperature and atmospheric pressure until the equivalent of 1 mol of hydrogen had been absorbed. The catalyst was removed by filtration and the filtrate was evaporated to dryness. Recrystallization of the residue from acetone-hexane afforded 7$\beta$-methyl-progesterone.

*Example II*

In the method of the previous example the progesterone was substituted by 17$\alpha$-hydroxyprogesterone. There were thus obtained as intermediates 3,20-bis-ethylenedioxy-$\Delta^5$-pregnen-17$\alpha$-ol, 7-bromo-3,20-bis-ethylenedioxy-$\Delta^5$-pregnen-17$\alpha$-ol, 3,20-bis-ethylenedioxy-$\Delta^5$-pregnen-7,17$\alpha$-diol, 3,20-bis-ethylenedioxy-$\Delta^5$-pregnen-17$\alpha$-ol-7-one, 7-methyl-3,20-bis-ethylenedioxy-$\Delta^5$pregnen-7,17$\alpha$-diol and 7-methyl-$\Delta^{4,6}$-pregnadien-17$\alpha$-ol-3,20-dione; the final compound obtained was 7$\beta$-methyl-17$\alpha$-hydroxyprogesterone.

*Example III*

To 10 cc. of acetic anhydride containing 300 mg. of p-toluenesulfonic acid there was added 1 g. of 7-methyl-$\Delta^{4,6}$-pregnadien-17$\alpha$-ol-3,20-dione and the mixture was stirred at room temperature for 24 hours. After pouring into water the crystalline precipitate was filtered, washed with water, dried and recrystallized from ether containing a few drops of pyridine. There was thus obtained the 3-enol-acetate-17-acetate corresponding to 7-methyl-$\Delta^{4,6}$-pregnadien-17$\alpha$-ol-3,20-dione.

The above compound was suspended in 100 cc. of a 0.5% solution of potassium hydroxide in methanol and the mixture was stirred for 1 hour at 15° C. It was then neutralized with acetic acid, concentrated to a small volume and diluted with water. The precipitate was collected, washed with water, dried and recrystallized from acetone-hexane, thus producing the C-17 acetate of 7-methyl-$\Delta^{4,6}$-pregnadien-17$\alpha$-ol-3,20-dione.

By hydrogenation of 7-methyl-$\Delta^{4,6}$-pregnadien-17$\alpha$-ol-3,20-dione acetate, following the method of hydrogenation described in Example I, there was obtained 7$\beta$-methyl-17$\alpha$-hydroxyprogesterone acetate.

*Example IV*

By the method of the previous example, there was prepared 7$\beta$ - methyl - 17$\alpha$ - hydroxyprogesterone acetate starting from 7$\beta$-methyl-17$\alpha$-hydroxyprogesterone i.e. 7$\beta$-methyl-17$\alpha$-hydroxy progesterone was treated with acetic anhydride in the presence of p-toluenesulfonic acid to produce the 3-enol-acetate-17-acetate of 7-methyl-17α-hydroxyprogesterone as an intermediate compound and the latter compound, by reaction with potassium hydroxide, was converted into 7β-methyl-17α-hydroxyprogesterone acetate.

*Example V*

A mixture of 2 g. of 7β-methyl-17α-hydroxyprogesterone, 30 cc. of dry benzene, 400 mg. of p-toluenesulfonic acid and 5 g. (4 molar equivalents) of caproic anhydride was heated on the steam bath until all of the solid material went into solution and then kept for 60 hours at room temperature. It was then poured into water and the excess of anhydride was hydrolyzed by vigorously shaking for 1 hour. The cooled mixture was extracted with ether, the extract was washed to neutral, dried over anhydrous sodium sulfate and evaporated to dryness. The oily residue consisted of the C-3-enol-caproate-C-17-caproate of 7-methyl-17α-hydroxyprogesterone. The pure compound was obtained by chromatography on neutral alumina.

The subsequent saponification of the enol-caproate group of the above compound, by treatment with methanolic potassium hydroxide in accordance with the method described in Example III, gave the caproate of 7β-methyl-17α-hydroxyprogesterone.

*Example VI*

By the methods of Examples III to V, there were prepared other C-3-enol-esters-C-17-esters of 7-methyl-Δ$^{4,6}$-pregnadien-17α-ol-3,20-dione and of 7β-methyl-17α-hydroxyprogesterone, by reaction with an excess of an anhydride of a hydrocarbon carboxylic acid of less than 12 carbon atoms. The saponification of the enol-ester group of these compounds yielded the corresponding C-17 ester of hydrocarbon carboxylic acids of less than 12 carbon atoms of 7-methyl-Δ$^{4,6}$-pregnadien-17α-ol-3,20-dione and of 7β-methyl-17α-hydroxyprogesterone, respectively. Specifically these included the cyclopentylpropionates and benzoates.

We claim:
1. A method for the production of 7β-methyl progesterone derivatives comprising brominating a 3,20-bis-cycloethyleneketal of a corresponding progesterone derivative to form a corresponding 7-bromo compound, reacting the bromo compound with alumina to form the corresponding 7-hydroxy derivative, oxidizing the 7-hydroxy derivative to a 7-keto compound, reacting the 7-keto compound with a methyl magnesium halide to form the corresponding 7-methyl-7-hydroxy derivative, hydrolyzing and dehydrating the 7-methyl-7-hydroxy derivative with an acid to form a 7-methyl-Δ$^{4,6}$-compound and selectively hydrogenating the 6-double bond of the last mentioned compound.
2. The 3-enol-17-diesters of hydrocarbon carboxylic acids of less than 12 carbon atoms of 7-methyl-Δ$^{4,6}$-pregnadien-17α-ol-3,20-dione.
3. The 17-esters of hydrocarbon carboxylic acids of less than 12 carbon atoms of 7-methyl-Δ$^{4,6}$-pregnadien-17α-ol-3,20-dione.
4. 3,20-bis-ethylenedioxy-Δ$^5$-pregnen-7-one.
5. 3,20-bis-ethylenedioxy-Δ$^5$-pregnen-17α-ol-7-one.
6. 7-methyl-3,20-bis-ethylenedioxy-Δ$^5$-pregnen-7-ol.
7. 7-methyl-3,20-bis-ethylenedioxy-Δ$^5$-pregnen-7,17α-diol.

References Cited in the file of this patent

UNITED STATES PATENTS

| | | |
|---|---|---|
| 2,753,290 | Fried et al. | July 3, 1956 |
| 2,769,822 | Gash | Nov. 6, 1956 |
| 2,805,230 | Stork et al. | Sept. 3, 1957 |
| 2,838,534 | Babcock et al. | Sept. 3, 1957 |
| 2,880,214 | Moffett et al. | Mar. 31, 1959 |

FOREIGN PATENTS

| | | |
|---|---|---|
| 546,555 | Canada | Sept. 24, 1957 |

OTHER REFERENCES

Lenhard et al.: J. Am. Chem. Soc., volume 78 (Mar. 5, 1956), pages 989–992.

Marshall et al.: J. Am. Chem. Soc., volume 79 (Dec. 5, 1957), pages 6303–6308.

Bann et al.: J. Chem. Soc. (London), September 1936, pages 1274–1276.

Fieser and Fieser: Steroids (1959), Reinhold Publishing Corp., page VII.